US012481764B2

(12) United States Patent
Regev et al.

(10) Patent No.: US 12,481,764 B2
(45) Date of Patent: Nov. 25, 2025

(54) FIRMWARE COMPONENT IDENTIFICATION AND VULNERABILITY ASSESSMENT

(71) Applicant: Microsoft Technology Licensing, LLC, Redmond, WA (US)

(72) Inventors: Gil Regev, Ramat-Gan (IL); Ori Perez, Tel Aviv (IL); Tamir Ariel, Tel Aviv (IL); Alon Yaakov Braverman, Tel Aviv (IL); Maayan Shaul, Herzliya (IL); Yogev Shitrit, Rishon Lezion (IL); Noa Frumovich, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 715 days.

(21) Appl. No.: 17/155,820

(22) Filed: Jan. 22, 2021

(65) Prior Publication Data

US 2022/0237300 A1     Jul. 28, 2022

(51) Int. Cl.
*G06F 8/53*     (2018.01)
*G06F 8/71*     (2018.01)
(Continued)

(52) U.S. Cl.
CPC .............. *G06F 21/577* (2013.01); *G06F 8/53* (2013.01); *G06F 8/71* (2013.01); *G06F 16/245* (2019.01); *G06F 2221/033* (2013.01)

(58) Field of Classification Search
CPC . G06F 21/577; G06F 8/53; G06F 8/71; G06F 16/245; G06F 2221/033; G06F 21/572
See application file for complete search history.

(56) References Cited

U.S. PATENT DOCUMENTS

| 2015/0100940 A1* | 4/2015 | Mockus | G06F 8/70 |
| | | | 717/101 |
| 2016/0098561 A1* | 4/2016 | Keller | G06F 21/566 |
| | | | 726/24 |

(Continued)

OTHER PUBLICATIONS

Alrabaee, et al., "On Leveraging Coding Habits for Effective Binary Authorship Attribution", In Proceedings of the 23rd European Symposium on Research in Computer Security, Sep. 3, 2018, 20 Pages.

(Continued)

*Primary Examiner* — Farid Homayounmehr
*Assistant Examiner* — Mudasiru K Olaegbe
(74) *Attorney, Agent, or Firm* — Weaver IP L.L.C.

(57) ABSTRACT

Methods, systems, apparatuses, and computer-readable storage mediums are described for identifying an origin of a device firmware component. A firmware disassembler is configured to disassemble firmware code obtained from a device, such as a portable electronics device, to generate assembly code. A decompiler is configured to decompile the assembly code to generate source code based on the device firmware. A code neutralizer generates a first neutralized code from the source code. A firmware identifier compares at least a portion of the neutralized code to a code repository to identify an origin of the firmware code. Based at least on the identified origin of the firmware code, a vulnerability determiner determines whether the firmware code contains a vulnerability, such as a security vulnerability that may be exploited.

20 Claims, 9 Drawing Sheets

(51) Int. Cl.
*G06F 16/245* (2019.01)
*G06F 21/57* (2013.01)

(56) References Cited

U.S. PATENT DOCUMENTS

| | | | | |
|---|---|---|---|---|
| 2016/0335057 | A1* | 11/2016 | Teodorescu | G06F 16/9566 |
| 2018/0203677 | A1* | 7/2018 | Hughes | G06F 8/53 |
| 2019/0079734 | A1* | 3/2019 | Kadam | G06F 21/577 |
| 2019/0156029 | A1* | 5/2019 | Ashey | G06F 21/57 |
| 2019/0213355 | A1* | 7/2019 | Raviv | G06F 3/0482 |
| 2020/0065074 | A1* | 2/2020 | Duan | G06F 16/282 |
| 2020/0074080 | A1* | 3/2020 | Srinivasagopalan | G06F 16/2462 |
| 2020/0394028 | A1* | 12/2020 | Byrne | G06F 9/45558 |
| 2022/0108020 | A1* | 4/2022 | Dang | G06F 8/658 |

OTHER PUBLICATIONS

"International Search Report and Written Opinion Issued in PCT Application No. PCT/US21/063943", Mailed Date: Apr. 4, 2022, 11 Pages.

Tang, et al., "LibDX: A Cross-Platform and Accurate System to Detect Third-Party Libraries in Binary Code", In Proceedings of IEEE 27th International Conference on Software Analysis, Evolution and Reengineering, Feb. 18, 2020, pp. 104-115.

* cited by examiner

400

---

| Map each of a plurality of symbols in source code to a plurality of neutralized symbols | 402 |

| Compare a token of a first neutralized code to a plurality of tokens in a code repository to identify an origin of a firmware code | 502 |

| Generate a confidence score that comprises a measure of confidence that an identification of an origin of the firmware code is accurate | 602 |

| Receive a known firmware code and an origin thereof | 702 |

| Store, in a code repository, a neutralized code generated from the known firmware code along with an indication of the origin of the known firmware code | 704 |

```
void ssl2_free(int param_1)
{
  void *ptr;
                              802
  if (param_1 != 0) {
    ptr = *(void **)(param_1 + 0x54);
    if (*(void **)((int)ptr + 0x30) != (void *)0x0) {
      CRYPTO_free(*(void **)((int)ptr + 0x30));
    }
    if (*(void **)((int)ptr + 0x34) != (void *)0x0) {
      CRYPTO_free(*(void **)((int)ptr + 0x34));
    }
    OPENSSL_cleanse(ptr,0x120);
    CRYPTO_free(ptr);
    *(undefined4 *)(param_1 + 0x54) = 0;
  }
  return;
}
```

```
void ssl2_free(long param_1)
{
  void *ptr;
                              812
  if (param_1 != 0) {
    ptr = *(void **)(param_1 + 0x78);
    if (*(void **)((long)ptr + 0x38) != (void *)0x0) {
      CRYPTO_free(*(void **)((long)ptr + 0x38));
    }
    if (*(void **)((long)ptr + 0x40) != (void *)0x0) {
      CRYPTO_free(*(void **)((long)ptr + 0x40));
    }
    OPENSSL_cleanse(ptr,0x158);
    CRYPTO_free(ptr);
    *(undefined8 *)(param_1 + 0x78) = 0;
    return;
  }
  return;
}
```

FIG. 8B

FIRMWARE COMPONENT IDENTIFICATION AND VULNERABILITY ASSESSMENT

BACKGROUND

Computing devices typically operate in accordance with software installed thereon. One such class of software is a device firmware, which generally comprises a set of instructions that are stored in a memory of a device for low-level control of the device's hardware components. In many instances, device vendors obtain software components, such as software libraries, from an open-source software (OSS) source in creating a firmware that is installed onto a device. The installed firmware may be based on a particular computing architecture of the device and may also be selectively modified based on the device's particular hardware and/or operation. In this manner, open-source components may be used for many purposes across a wide variety of devices.

However, as is common with many types of software, open-source software components (e.g., libraries) used within a device firmware may comprise vulnerabilities, such as security vulnerabilities that an attacker may attempt to exploit. For instance, a portable electronic device coupled to an enterprise network may have installed thereon a firmware including an open-source software component that can pose an immediate threat to the device and other devices coupled on the enterprise network. While the particular components used in the device firmware installed on such a device may be known to an installer (e.g., vendor) that initially configured the device, this information is not typically known to a purchaser of these types of devices in which firmware is already installed. In those instances, while device vendors may provide firmware updates, such updates are provide infrequently, resulting in a firmware being used on a device that contains several open-source components, each of which may potentially become outdated and/or contain a vulnerability, potentially resulting in unresolved security vulnerabilities across large networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for identifying an origin of a device firmware component. In one example, a firmware disassembler is configured to disassemble firmware code obtained from a device, such as a portable electronics device, to generate assembly code. A decompiler is configured to decompile the assembly code to generate source code based on the device firmware. A code neutralizer generates a first neutralized code from the source code. A firmware identifier compares at least a portion of the neutralized code to a code repository to identify an origin of the firmware code. Based at least on the identified origin of the firmware code, a vulnerability determiner determines whether the firmware code contains a vulnerability, such as a potential security vulnerability that may be exploited.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows a flowchart of a method for mapping symbols of source code to neutralized symbols, in accordance with an example embodiment.

FIG. 5 shows a flowchart of a method for comparing a token of code to tokens in a repository, in accordance with an example embodiment.

FIG. 6 shows a flowchart of a method for generating a confidence score that an identification is accurate, in accordance with an example embodiment.

FIG. 7 shows a flowchart of a method for learning a firmware code, in accordance with an example embodiment.

FIGS. 8A and 8B show illustrative examples of decompiled source code, in accordance with an example embodiment.

Figure 1:
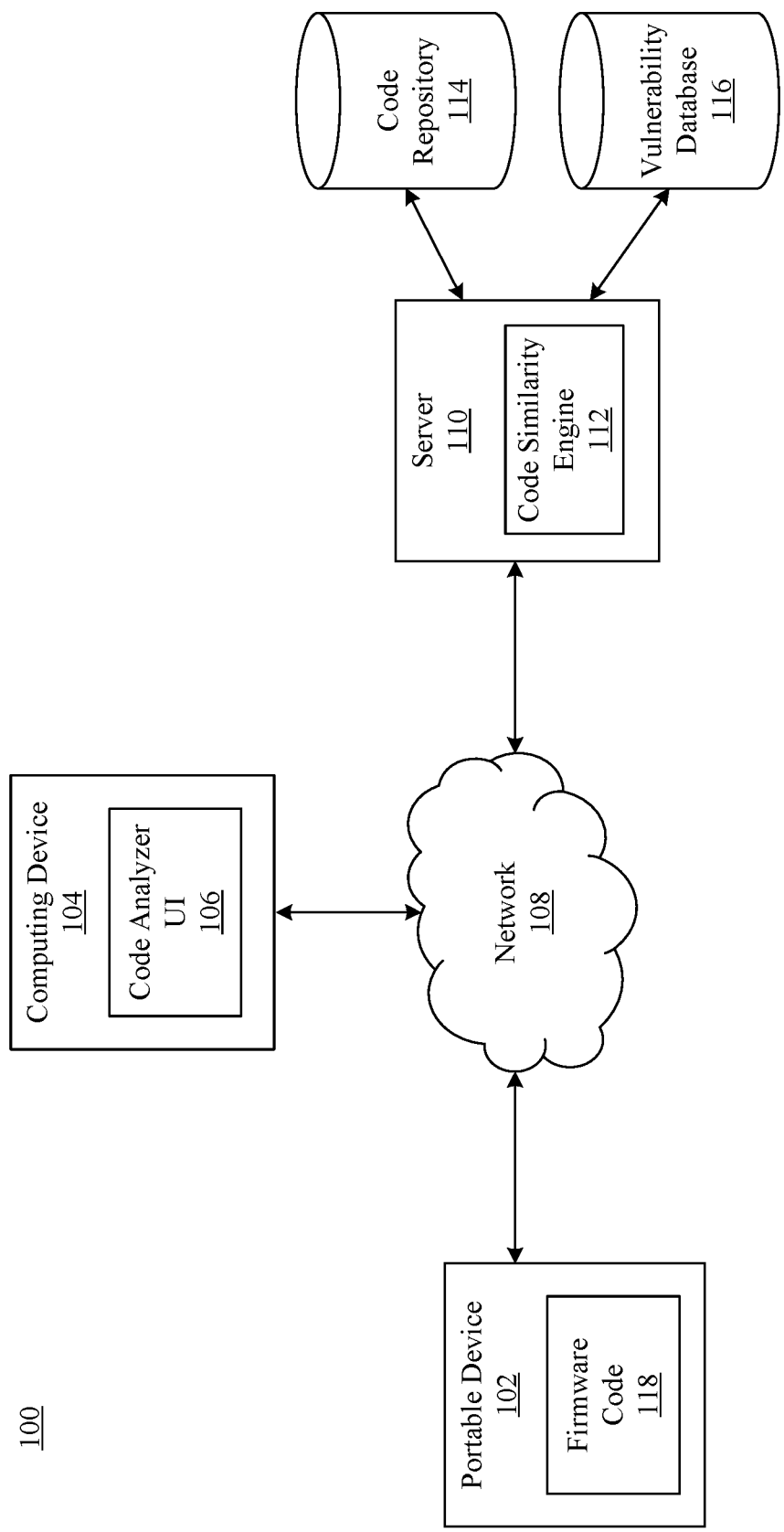
FIG. 1 shows a block diagram of a firmware identification system for identifying a device firmware, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Computing devices typically operate in accordance with software installed thereon. One such class of software is a device firmware, which generally comprises a set of instructions that are stored in a memory of a device for low-level control of the device's hardware components. In many instances, device vendors obtain software components, such as software libraries, from an open-source software (OSS) source in creating a firmware that is installed onto a device. The installed firmware may be based on a particular computing architecture of the device and may also be selectively modified based on a device's particular hardware and/or operation. In this manner, open-source components may be used for many purposes across a wide variety of devices.

However, as is common with many types of software, open-source software components (e.g., libraries) used within a device firmware may comprise vulnerabilities, such as security vulnerabilities that an attacker may attempt to exploit. For instance, a portable electronic device coupled to an enterprise network may have installed thereon a firmware including an open-source software component that can pose an immediate threat to the device and other devices coupled on the enterprise network. While the particular components used in the device firmware installed on such a device may be known to an installer (e.g., vendor) that initially configured the device, this information is not typically known to a purchaser of these types of devices in which firmware is already installed. In those instances, while device vendors may provide firmware updates, such updates are provided infrequently, resulting in a firmware being used on a device that contains several open-source components, each of which may potentially become outdated and/or contain a vulnerability, potentially resulting in unresolved security vulnerabilities across large networks.

Certain techniques exist to attempt to identify an open-source components in the firmware of a device and to identify the firmware itself (e.g., a library name and a version) based on locating a unique binary signature in the binary firmware code (e.g., the machine code of the executing firmware). However, such techniques are limited in application because software designed for one computing architecture can have a different type of assembly language than the same software designed for a different computing architecture, resulting in a completely different binary code. Such differences may make it difficult to identity unique binary signatures in the binary code that may be used to identify the content of the firmware. Further, these techniques do not typically work for static linking of libraries into software, such as when different sets of code are combined to generate a binary during the compilation process. Finally, some open-source libraries may not have any unique binary signatures at all that can be used to identify the library. Further, even where the same firmware is used for the same computing architecture, the resulting binary may nevertheless still be different due to certain compiler configurations, such as optimizations employed during the compilation process.

Embodiments described herein are directed to identifying an origin of a device firmware component. In an example system, a firmware disassembler is configured to disassemble firmware code obtained from a device, such as a portable electronics device, to generate assembly code. A decompiler is configured to decompile the assembly code to generate source code based on the device firmware. A code neutralizer generates a first neutralized code from the source code. A firmware identifier compares at least a portion of the neutralized code to a code repository to identify a component in the firmware code. Based at least on the identified component in the firmware code, a vulnerability determiner determines whether the firmware code contains a vulnerability, such as a potential security vulnerability that may be exploited.

The embodiments described herein may advantageously enable software with security vulnerabilities may be readily identified, allowing those vulnerabilities to be addressed to prevent exploitation by attackers. In this manner, the security of the devices on which such software is installed, as well as networks and/or resources coupled thereto (e.g., resources of an enterprise network) are improved. For example, techniques described herein ensure that code used in firmware or other software that may be outdated or contain security flaws is identified, even if the origins of such code are not known to a device consumer. Once an origin of the firmware is identified in accordance with techniques described herein, it may be determined whether the firmware contains any known security flaws that may put the device or other devices coupled to a network at risk, thereby allowing preventative actions to be implemented to mitigate potential attacks (e.g., updating the firmware as needed, disabling or placing the affected device(s) offline, etc.). By improving the detection and remediation of such security flaws through the identification of the origins of firmware, malicious activity affecting computing devices and/or networks may be reduced, thereby improving the functioning of both the network and computing devices coupled thereto.

An example that illustrates such advantages relates to Internet of Things (IoT) devices, which may comprise network-coupled devices (e.g., smart sensors, televisions, cameras, voice over IP devices, etc.) used for various purposes. Typically, such IoT devices may have firmware installed thereon by a device manufacturer or vendor, where the firmware includes code from open-source libraries or the like. While the origins of the software components may be known to the manufacturer or vendor, software updates may still be infrequent or even non-existent in some cases, leading to any potential security flaws of IoT devices being unaddressed, thereby placing the device and other devices coupled to the same network at risk for an attack. In accordance with techniques described herein, the origins of software components may be readily identified, e.g., using the binary code of the software. Once identified, it may be determined whether any known security issues exist for any components included in the firmware installed on the IoT device, which may be addressed in an appropriate manner (e.g., updating the firmware to a newer version where the vulnerability has been addressed). By identifying and fixing such flaws in IoT devices, the security of these devices can be improved. Further, in some instances, techniques described herein may be used to reduce the risk of deploying devices that may comprise vulnerabilities by checking the firmware of IoT (or similar) devices prior to deployment. Thus, even where computing devices have software (e.g., firmware) installed there on that is not updated frequently and therefore may be at risk due to security issues, the origins of the software components and any associated vulnerabilities can be detected and addressed in accordance with the disclosed techniques. Numerous such techniques are disclosed herein.

As such, example embodiments are described herein directed to techniques for identifying an origin of a firmware component. For instance, FIG. 1 shows a block diagram of a system 100 for identifying an origin of a device firmware component, in accordance with an example embodiment. As shown in FIG. 1, system 100 includes a portable device 102, a computing device 104, a network 108, a server 110, a code repository 114, and a vulnerability database 116. Portable device 102 includes firmware code 118. Computing device 104 includes a code analyzer user interface (UI) 106. Server 110 includes a code similarity engine 112. As is described in greater detail below, code similarity engine 112 may obtain firmware code 118 and identify an origin of a component in the firmware code based at least on one or more comparisons with code stored in code repository 114. Code similarity engine 112 may also identify whether the identified firmware component contains a security vulnerability based at least on accessing vulnerability database 116, described in greater detail below. Example computing devices that may incorporate the functionality of portable device 102, computing device 104, and server 110 (or any subcomponents therein) are described below in reference to FIGS. 11 and 12. It is noted that system 100 may comprise any number of devices, including those illustrated in FIG. 1 and optionally one or more further devices or components not expressly illustrated. System 100 is further described as follows.

Network 108 may include one or more of any of a local area network (LAN), a wide area network (WAN), a personal area network (PAN), a combination of communication networks, such as the Internet, and/or a virtual network. In example implementations, portable device 102, computing device 104, and server 110 may be communicatively coupled to each other via network 108. In an implementation, any one or more of portable device 102, computing device 104, and server 110 may communicate via one or more application programming interfaces (API) and/or according to other interfaces and/or techniques. Portable device 102, computing device 104, and server 110 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Portable device 102 may comprise any type of device that may have software installed or stored thereon. Such software may include any type of software for execution using one more processing components, such as firmware code 118. Firmware code 118 may include any binary or machine code that may be executed on portable device 102. Firmware code 118 may be generated from compiling a higher level language, (e.g., a programming language). In examples, firmware code 118 comprises low-level instructions that initializes one or more hardware components of portable device 102, define the functionality of one or more such hardware components, and/or enable portable device 102 to operate as intended. Firmware code 118 includes any number of components (e.g., software components). In example embodiments, such software components include one or more open-source libraries, such as libraries obtained from a third-party source.

Firmware code 118 may be stored in any suitable memory of portable device 102, such as read-only memory (ROM), flash memory, programmable memory (e.g., erasable programmable read-only memory (EPROM), electrically erasable programmable read-only memory (EEPROM), etc.), or any other type of memory or storage device. It will be appreciated that although example embodiments are described herein with respect to portable device including firmware code 118, software installed on portable device 102 may include any other type of software, including but not limited to other firmware, applications, operating systems, software packages, etc. Thus, it is understood that techniques described herein may also be used to analyze any type of software that may be installed or stored on portable device 102.

Portable device 102 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. It is also noted that portable device 102 may include any other device, stationary or mobile, that may include a computing component installed therein, such as media players, televisions, appliances, etc.

In example implements, portable device 102 may be powered with one or more batteries, including but not limited to alkaline batteries, lithium-ion (Li-ion) batteries, lithium coin batteries, carbon zinc batteries, nickel cadmium batteries (Ni-Cad), nickel-metal hydride (Ni—MH) batteries, lead-acid batteries, or other types of batteries as will be appreciated to those skilled in the art. Batteries may be internal or external to a housing of portable device 102, and may be disposable or rechargeable. Batteries of portable device 102 may be any size or shape (e.g., coin, AAA, AA, C, D, automotive, etc.).

In implementations, portable device 102 may comprise a portable device, such as an IoT or Artificial Intelligence of Things (AIoT) device. Such devices may include one or more components, such as a sensor, for capturing data that is stored on portable device 102 and/or provided to another computing device. In some implementations, portable device 102 may comprise one or more processing components, including but not limited to a central processing unit (CPU), a microcontroller or microcontroller unit (MCU), a microprocessor or micro processing unit (MPU), system on module or system on motherboard (SoM), system on a chip (SoC), multi-chip module (MCM), or other type of processor. In some examples, one or more of such processing components may comprise a hardware accelerator such as a tensor processing unit (TPU), a graphics processing unit (GPU), a field-programmable gate array (FPGA), an Application Specific Integrated Circuit (ASIC), or other specialized hardware processor that may execute certain types of processing. Portable device 102 may also include one or more storage devices for storing information, including but not limited to firmware code 118, other software, data obtained from one or more sensors, or any other information. In some instances, a hardware accelerator of portable device 102 may perform processing operations with respect to training and/or executing a machine-learning (ML), artificial intelligence (AI) model, a deep neural network (DNN), or other types of classification or prediction models.

Computing device 104 includes any one or more computing devices of one or more users (e.g., individual users, family users, enterprise users, governmental users, etc.) that may comprise one or more applications, operating systems, virtual machines, storage devices, etc. that may be used to access, manage, or otherwise communicate with portable device 102. Computing device 104 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. Computing device 104 is not limited to a physical machine, but may include other types of machines or nodes, such as a virtual machine. Computing device 104 may interface with other components illustrated in FIG. 1 through APIs and/or by other mechanisms.

Computing device 104 may be configured to configure portable device 102, including software installed thereon (such as firmware code 118) to enable portable device 102 to operate as intended. In some examples, computing device 104 may comprise an interface through which a user or administrator may create and/or download firmware code from a remote repository, such as an open-source database, for installation on portable device 102 as firmware code 118. Firmware code 118 may be provided by computing device 104 to portable device 102 in various ways, including but not limited to via network 108, or via one or more other couplings (e.g., a USB cable, a wireless connection, etc.). In some example embodiments, computing device 104 may download firmware code 118 from portable device 102 and/or update firmware code 118 via network 108 or through any other suitable coupling.

Computing device 104 may comprise any suitable user interface for interaction (e.g., via a browser by navigation to a web page, via an application stored thereon, etc.), examples of which are described below with respect to FIGS. 11 and 12. In some examples, computing device 104 may comprise code analyzer UI 106 via which firmware code 118 may be analyzed, or caused to be analyzed, by code similarity engine 112. For instance, code analyzer UI 106 may provide an interface via which firmware code 118 may be obtained a storage of computing device 104 and/or from portable device 118, and provided to code similarity engine 112 for identification (e.g., to identify an origin of a component thereof, and/or any associated vulnerabilities). In examples, code analyzer UI 106 comprises one or more UI elements (e.g., display windows, interactive elements, menus, text-input fields, etc.) via which firmware code 118 may be selected, uploaded, and/or analyzed. Code analyzer UI 106 may also elements that obtain results of a firmware identification from code similarity engine 112, such as an identification of the origin of a component of firmware code 118, a version thereof, and/or any associated security vulnerabilities. Code analyzer UI 106 may also be configured to present, via one or more UI elements, any other information generated by code similarity engine 112, as is described in greater detail below.

Server 110 may comprise any number of devices, such as a network-accessible server (e.g., a cloud computing server network) that may receive code for identification (e.g., firmware code 118) and determine whether such code may contain any security vulnerabilities. For example, server 110 may comprise a group or collection of servers (e.g., computing devices) that are each accessible by a network such as the Internet (e.g., in a "cloud-based" embodiment). In example embodiments, server 110 is a computing device that is located remotely (e.g., in a different facility) from portable device 102 and/or computing device 104, and communicatively coupled thereto via network 108. Server 110 may comprise any number of computing devices, and may include any type and number of other resources, including resources that facilitate communications with and between servers, storage by the servers, etc. (e.g., network switches, storage devices, networks, etc.). In an embodiment, devices of server 110 may be co-located (e.g., housed in one or more nearby buildings with associated components such as backup power supplies, redundant data communications, environmental controls, etc.) to form a datacenter, or may be arranged in other manners. Accordingly, in an embodiment, server 110 may be a datacenter in a distributed collection of datacenters.

Code similarity engine 112 may obtain code (e.g. firmware code 118), analyze the code to identify an origin thereof, identify any associated vulnerabilities, and provide information related to the identified origin and associated vulnerabilities to code analyzer UI 106. Code similarity engine 112 may operate in various ways, as is described in greater detail below. In some examples, code similarity engine 112 disassembles firmware code 118 to generate assembly code, decompiles the assembly code to generate source code, and generate neutralized code from the source code. The neutralized code may comprise code that neutralizes (e.g., abstracts or removes) portions of the code that be architecture-dependent, such that the neutralized code removes such architecture-dependent differences. Code similarity engine 112 may compare the neutralized code to code stored in code repository 114 to identify an origin of firmware code 118, such as an open-source library or other software component that may be contained in firmware code 118. In some implementations, code similarity engine 112 may also identify, based on a comparison of at least a portion of the neutralized code with code repository 114, a version of firmware code 118 (e.g., a version of the open-source library). Code similarity engine 112 may access vulnerability database 116 to determine whether firmware code 118 contains a vulnerability based at least on the identified origin of firmware code 118. In this manner, code similarity engine 112 may determine whether firmware code 118 of portable device 102 contains potential security flaws that may need to be remedied to mitigate an undesired exploitation. Further details regarding the operation code similarity engine 112 is described in greater detail below.

Code repository 114 comprises a repository (e.g., data store, database, table, or any other file structure or combination thereof) that stores information associated with one or more known codes. For instance, code repository 114 may comprise a repository of neutralized code generated from various code libraries (e.g., open-source libraries), along with an identification of each code library and/or associated code library version. Code repository 114 may be generated in various ways, including but not limited to, passing known samples of code through code similarity engine 112 for storage in code repository 114.

Vulnerability database 116 comprises a database that identifies one or more actual or potential security vulnerabilities associated for each of a plurality of known codes or code libraries. For instance, vulnerability database 116 may indicate, for each item of known code or code library, whether a security vulnerability exists, a level of the security vulnerability (e.g., low risk, medium risk, high risk, critical risk, etc.), types of security vulnerabilities, whether an updated code or code library exists that addresses the vulnerability, and any other information associated with the code, code library, or an associated vulnerability. As described in greater herein, information obtained from vulnerability database 116 by code similarity engine 112 may be provided to code analyzer UI 106, which may enable a user or administrator to update firmware code 118 to resolve the identified vulnerabilities of portable device 102. Accordingly, by identifying an origin of the firmware code as described (e.g., to identify an open-source library used therein), known vulnerabilities may be readily detected within the firmware, even if the vendor or developer that created the firmware has not identified such a vulnerability. In this manner, the firmware installed on portable device 102 (or a plurality of such devices on a large network) may be analyzed for vulnerabilities readily, and it may be determined whether such devices are secure for use within the network.

It is noted and understood that implementations are not limited to the illustrative arrangement shown in FIG. 1. For instance, portable device 102, computing device 104, server 110, code repository 114, and vulnerability database 116 need not be separate or located remote from each other. In some examples, portable device 102, computing device 104, server 110, code repository 114, and vulnerability database 116 (or any subcomponents therein) may be located in or accessible via the same computing device. Furthermore, system 100 may comprise any number of computing devices, servers, and/or portable devices (e.g., tens, hundreds, or even thousands of such devices) coupled in any manner.

Figure 2:
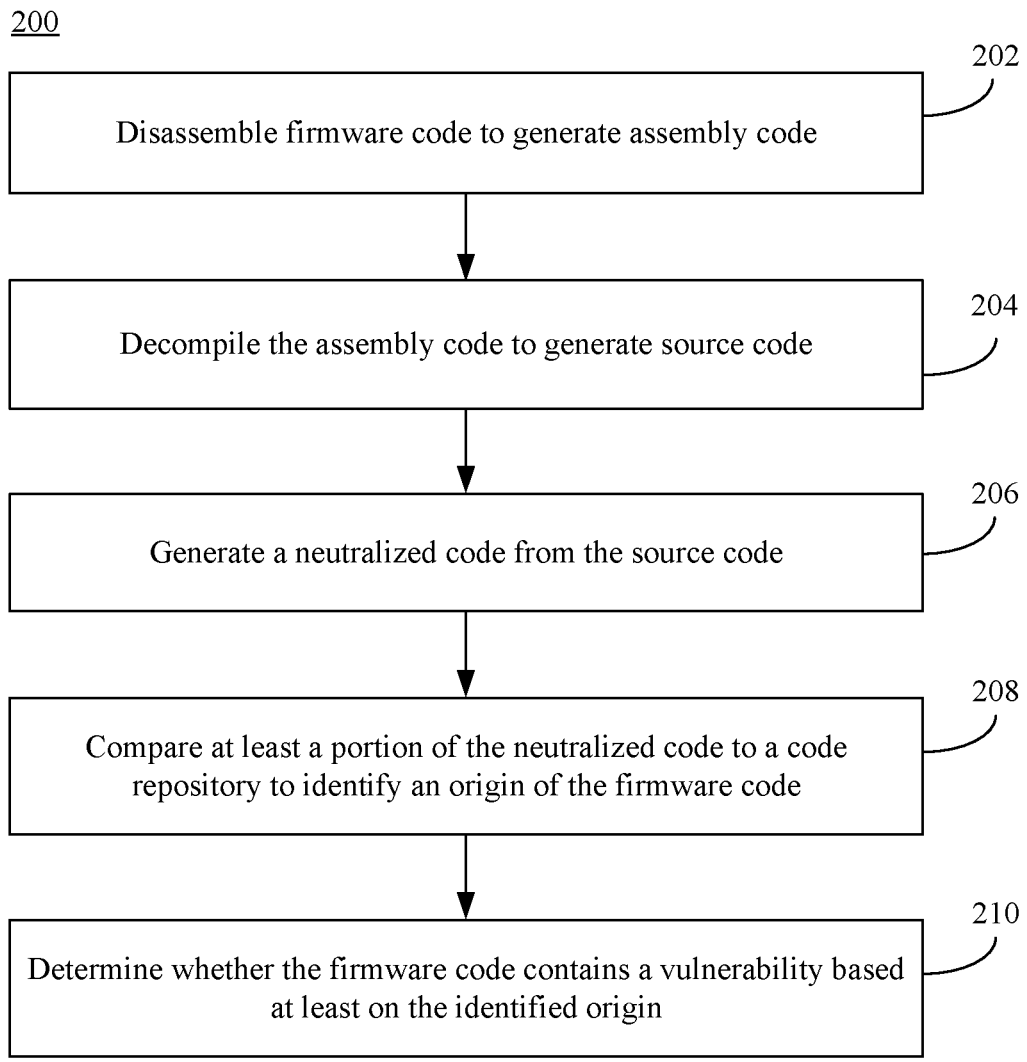
FIG. 2 shows a flowchart of a method for identifying a device firmware, in accordance with an example embodiment.

Code similarity engine 112 may operate in various ways to identify a device firmware. For instance, code similarity engine 112 may operate according to FIG. 2. FIG. 2 shows a flowchart 200 of a method for identifying an origin of a device firmware component, in accordance with an example embodiment. For illustrative purposes, flowchart 200 and code similarity engine 112 are described as follows with respect to FIG. 3.

Figure 3:
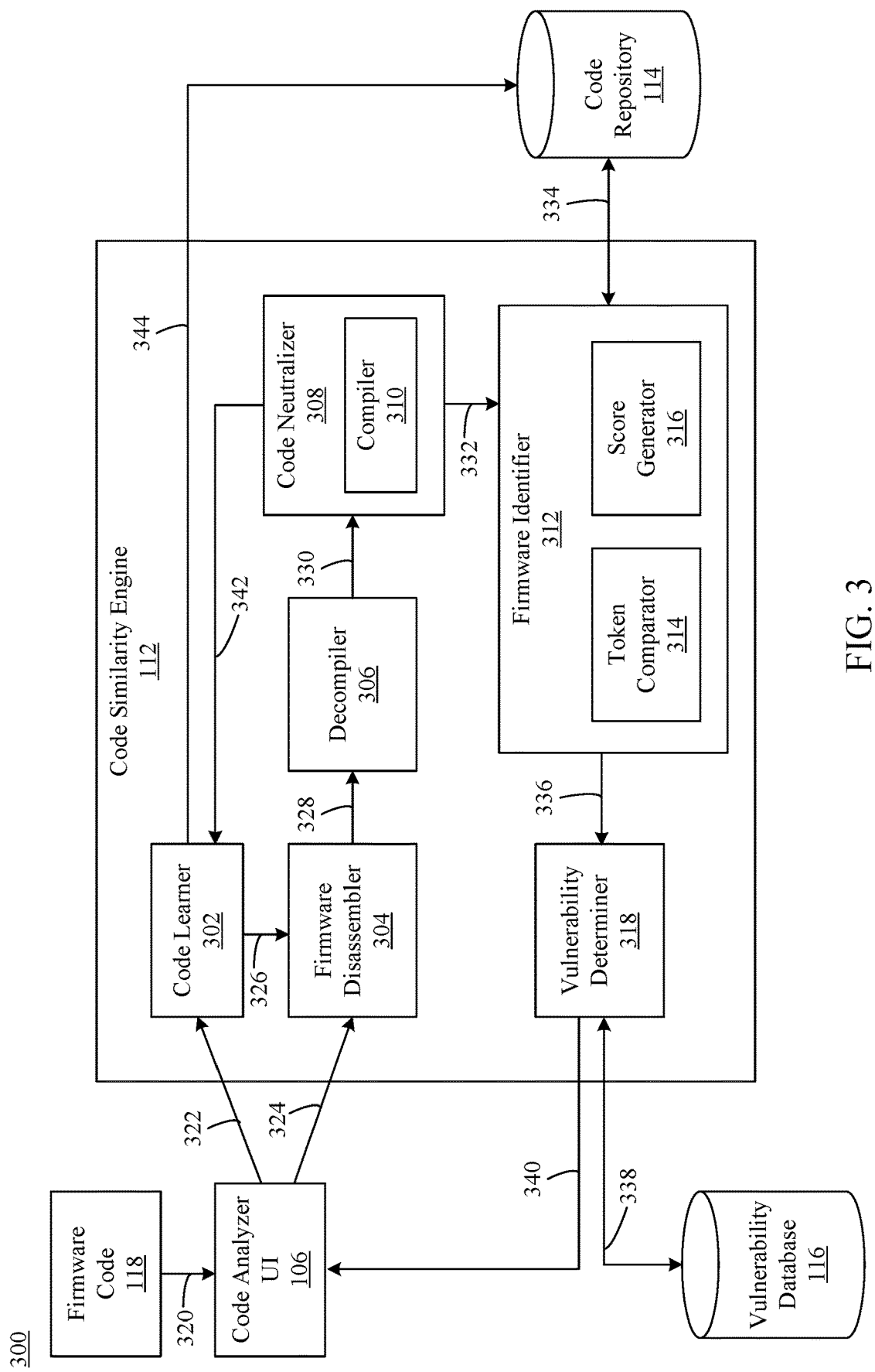
FIG. 3 shows a block diagram of a firmware identification system for identifying a device firmware implementing techniques described herein, in accordance with an example embodiment.

FIG. 3 shows a block diagram of a system 300 for identifying an origin of a device firmware component implementing techniques described herein, in accordance with an example embodiment. As shown in FIG. 3, system 300 includes an example implementation of code analyzer UI 106, code similarity engine 112, code repository 114, vulnerability database 116, and firmware code 118. As shown in FIG. 3, code similarity engine 112 includes a code learner 302, a firmware disassembler 304, a decompiler 306, a code neutralizer 308, a firmware identifier 312, and a vulnerability determiner 318. Code neutralizer 308 includes a compiler 310. Firmware identifier 312 includes a token comparator 314 and a score generator 316. Flowchart 200 and system 300 are described in further detail as follows.

Flowchart 200 of FIG. 2 begins with step 202. In step 202, firmware code is disassembled to generate assembly code. For instance, with reference to FIG. 3, firmware disassembler 304 may be configured to obtain 324 firmware code 118 and generate assembly code therefrom. Firmware disassembler 304 may receive firmware code 118 in various ways, such as via interaction with code analyzer UI 106. For example, code analyzer UI 106 may provide an interface via which a user may interact with one or more elements to select or upload 320 firmware code 118 and transmit it to firmware disassembler 304, along with a request to identify an origin of firmware code 118. Firmware code 118 may comprise any part of a firmware installed on portable device 102, including a portion of the firmware or the entire firmware. Furthermore, firmware code 118 may contain any number of components (e.g., software components such as open-source libraries or the like). Techniques described herein may be used to identify an origin of a particular component or a plurality of origins (e.g., a plurality of open-source libraries) contained in firmware code 118. In other words, firmware code 118 obtained by firmware disassembler 304 may include any number of components, and any number of associated origins (and/or associated versions) may be identified.

As described herein, firmware disassembler 304 may be configured to disassemble firmware code 118 to generate assembly code. Assembly code (also referred to as assembly language) generated by firmware disassembler 304 may include any lower level programming language that is a translation of firmware code 118. In examples, assembly code generated by firmware dissembler 304 may include a textual code (e.g., a set of alphanumeric characters, strings, etc.) that is a translation of a binary code or machine language of the firmware code. For instance, assembly language generated by firmware disassembler 304 may include a human-readable programming language generated as a result of translating firmware code 118. In other words, firmware disassembler 304 may be configured to extract, from firmware code 118, assembly language generated therefrom relating to the instructions contained in the code. Firmware disassembler 304 may utilize any suitable translation to generate assembly code as will be appreciated to those skilled in the relevant arts. In examples, firmware disassembler 304 may generate assembly code for all or a part of firmware 118. For instance, the generated assembly code may be generated for only a portion of firmware code 118, may be generated for a plurality of different portions, or may be generated for all of firmware code 118.

It is noted that an assembly language generated by firmware disassembler 304 may be dependent on a CPU architecture on which firmware code 118 is designed to execute, as well as the compiler used to compile the original firmware code and/or any compiler configurations or optimizations used during the compilation process of firmware code 118. For instance, the same firmware designed for different CPU architectures (e.g., Advanced RISC (reduced instruction set computing) Machines (ARM), Microprocessor without Interlocked Pipelined Stages (MIPS), X86, X64, PowerPC, etc.) or using different compilers or compiler configurations may result in generation of different assembly language by firmware disassembler 304.

In step 204, the assembly code is decompiled to generate source code. For instance, with reference to FIG. 3, decompiler 306 may obtain 328 assembly code from firmware disassembler 304 and decompile the obtained assembly code to generate source code therefrom. Source code generated by decompiler 306 may comprise a higher level programming code than the obtained assembly code. In some examples, the source code generated by decompiler 306 may comprise any suitable programming language as will be appreciated by those skilled in the relevant arts, such as R, Python, Java, C, C++, C#, or any other suitable programming language.

In this manner, firmware disassembler 304 and decompiler 306 may accordingly convert a machine code (i.e., firmware code 118) to an assembly code, and then convert the assembly code to a programming language (e.g., C programming language) that is based on the original firmware code 118. As noted earlier, assembly code generated by firmware disassembler 304 may be dependent on a computing architecture, compiler, or compiler configuration. As a result, because assembly code may be different for the same firmware, decompiler 306 may also generate different source code for the same firmware. In other words, because differences may exist with how an original firmware code (e.g., firmware code) is generated for deployment to portable device 102, source code generated as a result of decompiling assembly code based thereon may accordingly be different, even for the same firmware deployed for two different implementations. Although such differences may be present, certain similarities may also be present following the decompiling process. An illustration of source code generated by decompiler 306 is described below with respect to FIGS. 8A, 8B, 9A, and 9B.

In step 206, a first neutralized code is generated from the source code. For instance, with reference to FIG. 3, code neutralizer 308 may obtain 330 the source code generated by decompiler 306 and generate therefrom a neutralized code. In examples, the neutralized code may be a set of alphanumeric characters, such as a set of strings or a signature, generated from the source code, where the neutralized code is abstracted or neutralized to remove certain language that may be specific to a computing architecture or compiler. In other words, code neutralizer 308 may generate neutralized code by removing language that is the result of specific implementations of a firmware.

For instance, code neutralizer 308 may comprise compiler 310 that is configured to compile source code into a separate neutralized code, where the neutralized code abstracts language of source code. Compiler 310 may convert the programming language of the source code (e.g., C language) to a language that describes (e.g., captures) logic of the source code in a neutralized fashion, such that differences are abstracted. The neutralized code may be a type of an intermediate language (IL), or may be referred to herein as a share firmware code (SFC). By generating neutralized code in such a manner, compiler 310 may therefore generate a language that removes certain differences resulting from different CPU architectures or compiler configurations in the assembly code, while also maintaining the logic or framework of firmware code 118. However, in some instances, certain artifacts of a CPU architecture or compiler configuration may still be present after generating the neutralized code. Such artifacts may be taken into account during a code comparison phase, as described below. Further details and examples of the operation of code neutralizer 308 will also be described in greater detail below (e.g., with respect to FIGS. 4, 8A, 8B, 9A, and 9B).

In step 208, at least a portion of the neutralized code is compared to a code repository to identify an origin of the firmware code. For instance, with reference to FIG. 3, firmware identifier may be configured to obtain 332 the neutralized code generated by code neutralizer 308 and compare at least a portion of the neutralized code to code stored in code repository 114 to identify an origin of firmware code 118. Firmware identifier 312 may identify an origin of firmware code 118 in various ways. In some examples, firmware identifier 312 may compare 334 all or part of the neutralized code generated by code neutralizer 308 to code that is stored in code repository 114 to identify one or more matching codes. Matching codes in identified from code repository 114 may be partial or complete (e.g., identical) matches. For instance, firmware identifier 312 may identify one or more neutralized codes stored in code repository 114 that partially matches the neutralized code generated by code neutralizer 308, or may identify one or more neutralized codes stored in code repository 114 that is an identical match to the generated neutralized code. Further details regarding the identification of the origin of firmware code 118 based on a comparison of code stored in code repository 114 is described in greater detail below.

Based on identifying a matching code stored in code repository 114, firmware identifier 312 may identify an origin of firmware code 118. In examples, code repository 114 may store, for each code stored therein, an origin of the code. In some further example embodiments, code repository 114 may also store, for each code stored therein, a version (e.g., a software or code version, a version number, a version date, etc.) of the code. In some implementations, code repository may comprise a repository of neutralized code generated from various open-source code libraries, along with an identification of an origin of each code library (e.g., a library name, developer, vendor, designer, etc.), an associated code library version, or any other information associated with the library. By comparing one or more portions of the neutralized code generated by code neutralizer 308 to neutralized code stored in code repository 114, firmware identifier 312 may therefore identify an origin of a code library (or libraries) used in firmware code 118, along with a version of such code library used in the firmware code. In other words, even in instances where an origin and/or version of firmware code 118 may be unknown to a client or customer (e.g., since firmware code 118 is stored on portable device 118 in an executable binary), techniques described herein may enable the identification of the origin of such code.

In step 210, it is determined whether the firmware code contains a vulnerability based at least on the identified origin. For instance, with reference to FIG. 3, vulnerability determiner 318 may be configured to obtain 336 an identification of the origin, and determine, based at least on the identified origin of firmware code 118, whether firmware code 118 contains a vulnerability. In examples, vulnerability determiner 318 may determine whether firmware code 118 contains a vulnerability by accessing 338 vulnerability database 116 which comprises a database of vulnerabilities (e.g., common vulnerabilities and exposures, or CVEs) for each code library and/or code library version. In implementations, identification of the origin of the firmware, version of the firmware, and any associated vulnerabilities may be provided 340 for presentation on code analyzer UI 106, along with any other related information (e.g., a security score, or other assessment of whether the analyzed firmware is safe for use on portable device 102).

Vulnerability database 116 may be generated in various ways. For instance, vulnerability database 116 may be populated by receiving an indication of known vulnerabilities for one or more code libraries or versions thereof from an external source (e.g., via network 108), may be generated by an administrator or developer, or via any other means as appreciated to those skilled in the relevant arts. Vulnerability database 116 may store any type of known or perceived vulnerability for each code library and/or version. Examples of such vulnerabilities include, but are not limited to, vulnerable code paths, default passwords, private certificates, or any other vulnerability that may potentially comprise portable device 102, other resources coupled to network 108, and/or any data (e.g., sensitive data) stored or accessible therein. Vulnerability database 116 may also indicate, for each vulnerability identified therein, a level of each vulnerability (e.g., low risk, medium risk, high risk, critical risk, etc.), a type of the vulnerability, whether an updated code or code library exists that addresses the vulnerability, and any other information associated with the code, code library, or an associated vulnerability. While vulnerability database 116 is shown as being separate from code repository 114, it is understood that vulnerability database 116 and code repository 114 may be part of the same database or repository and/or stored local to each other.

As described, therefore, code similarity engine 112 may be configured to identify an origin of code used in firmware code 118, such as identifying a code library (e.g., an open-source library) and an associated version of the open-source library based at least on a binary code of the firmware. For instance, code analyzer UI 106 may enable a user to provide a firmware file (e.g., firmware code 118) to code similarity engine 112, after which code similarity engine 112 may analyze the firmware file as described to identify an origin of the firmware and/or an associated version, and whether any vulnerabilities may be present in the firmware. Thus, even if portable device 102 may be running the latest version of a firmware, if such a firmware contains a known vulnerability, techniques described herein may enable identification of any open-source libraries (and versions thereof) used in the firmware and any associated vulnerabilities. Based such identification, it may be determined whether portable device 102 is safe to use, whether it may be made more secure by updating the firmware stored therein, or whether the device should not be used based on the detected vulnerabilities.

As described above, compiler 310 may compile source code generated by decompiler 306 into neutralized code. For example, FIG. 4 shows a flowchart of a method for mapping symbols of source code to neutralized symbols, in accordance with an example embodiment. In an implementation, the method of flowchart 400 may be implemented by compiler 310. FIG. 4 is described with continued reference to FIG. 3. Other structural and operational implementations will be apparent to persons skilled in the relevant art(s) based on the following discussion regarding flowchart 400 and system 300 of FIG. 3.

Flowchart 400 begins with step 402. In step 402, each of a plurality of symbols in a source code are mapped to a plurality of neutralized symbols. For instance, with reference to FIG. 3, compiler 310 may be configured to map each of a plurality of symbols generated by decompiler 306 to a plurality of neutralized symbols in generating a neutralized code. In examples, compiler 310 comprises a set of rules that maps symbols (e.g., characters, commands, instructions, functions, or other text of source code) of a programming language to symbols of another code (e.g., SFC, or neutralized code). Based on such a set of rules, compiler 310 may thereby transform source code, including all symbols contained therein, to neutralized code, where the neutralized code comprises a different set of symbols.

In examples, the symbols of the neutralized code may comprise abstracted versions of symbols of the programming language. In some implementations, the total number of available symbols in set of symbols for the neutralized code may be less than the total number of available symbols for the programming language. In some other implementations, the length of one or more symbols for the neutralized code may be less than the length of corresponding symbols for the programming language. In this manner, compiler 310 may generate a neutralized code that comprises one or more symbols with a shorter length than the symbols of the programming language, resulting in a neutralized code that is shorter in an overall length than the source code.

As noted earlier, the neutralized code may generated in a manner that preserves or maintains at least a portion of the logic of the source code generated by decompiler 306. Thus, while at least a portion of the logic is preserved or maintained in the neutralized code based on the mapping of symbols described herein, the length of the symbols contained in the neutralized code and/or the overall length of the neutralized code may be generated by compiler 310 may be reduced compared to the source code. As an illustrative example, all types of functions (e.g., a "CRYPTO_free" function, an "OPENSSL_cleanse" function, etc.) of the source code may be mapped to a single character symbol "Z." As a result of such mapping, at least a portion of the logic (e.g., a framework) of the source code may still be maintained in the neutralized code, while also generating the neutralized code in a manner that is abstracted and shorter compared to the source code. Additional illustrative examples of mapping source code symbols to neutralized code symbols is described below (e.g., with respect to FIGS. 9A and 9B).

In some implementations, token identifier 312 identifies an origin of firmware code 118 based at least on tokens of the neutralized code and code in the code repository. For example, FIG. 5 shows a flowchart of a method for comparing a token of code to tokens in a repository, in accordance with an example embodiment. In an implementation, the method of flowchart 500 may be implemented by token comparator 314. FIG. 5 is described with continued reference to FIG. 3. Other structural and operational implementations will be apparent to persons skilled in the relevant art(s) based on the following discussion regarding flowchart 500 and system 300 of FIG. 3.

Flowchart 500 begins with step 502. In step 502, a token of a first neutralized code is compared to a plurality of tokens in a code repository to identify an origin of a firmware code. For instance, with reference to FIG. 3, token comparator 314 may be configured to compare a token of neutralized code generated by code compiler 310 to a plurality of tokens stored in code repository 114 to identify an origin of firmware code 118. As described herein, a token comprises any portion of neutralized code, which may be a single character or a string of sequential characters. In some implementations, a token may comprise the same set of characters as the symbols described earlier. In other implementations, a token may comprise a fixed number of characters (e.g., one character, two characters, etc.), or may be variable. Illustrative examples of tokens is described in greater detail below with respect to FIG. 10.

Token comparator 314 may identify tokens as described herein from the neutralized code to generate a set of tokens that represent the neutralized code. Each token may therefore comprise a smaller portion of the neutralized code. In some implementations, token comparator 314 may generate tokens based on a subset of characters present in the neutralized code. For instance, token comparator 314 may selectively remove certain alphanumeric characters (e.g., brackets, parenthesis, etc.) from the neutralized code when separating the neutralized code into a plurality of smaller tokens.

In identifying an origin of firmware code 118, token comparator 314 may compare one or more of the generated tokens of the neutralized code with a plurality of tokens stored in code repository 114. For instance, as described above, code repository 114 may comprise neutralized code for each of a plurality of known code libraries. In some implementations, code repository 114 store, for each of the plurality of known code libraries, a set of tokens that represent the neutralized code the code library. In this manner, token comparator 314 may compare one or more of the generated tokens generated based on firmware code 118 with the tokens stored in code repository 114 to identify a matching token, or a set of matching tokens, that may be determined to identify the origin of firmware code 118.

Token comparator 314 may compare the tokens as described in various ways. In some examples, token comparator 314 may compare tokens of the neutralized code with the tokens stored in code repository 114 using a text similarity search. Using a text similarity search, token comparator 314 may determine whether one or more tokens in the code repository are a partial or complete match to a token of the neutralized code. Token comparator 314 may repeat such a search for each token present in the neutralized code in attempting to identify a matching code in the code database. In other words, token comparator 314 may search for a matching code in code repository 114 based on text comparing smaller portions of code (e.g., tokens).

In this manner, even if a neutralized code generated by code neutralizer 308 may not be a complete match to one or more codes stored in code repository 114, token comparator 314 may nevertheless identify a code stored in code repository 114 that comprises the greatest amount of overlap with the neutralized code, such as by identifying a code that has the largest number of matching tokens. For example, due to differences as noted herein (e.g., computing architectures, compiler configurations, etc.), neutralized code generated by computer 310 may still contain differences with one or more codes stored in the repository. Such differences may include small changes to the neutralized code (e.g., a difference in the alphanumeric characters of one or more tokens), missing code (e.g., missing tokens or portions thereof), or additional code (e.g., additional tokens or portions thereof). By splitting the neutralized code into small tokens as described, token comparator 314 may overcome such small differences by finding similar codes based on matching of the tokens contained therein. In other words, even if the neutralized code generated based on firmware code 118 contains certain differences with respect to a matching code stored in the repository, token comparator 314 may still identify the matching code based on a text search of the tokens in the code repository. Once a matching code (e.g., the most similar matching code based on a text similarity) is located, the origin of firmware code 118 and any associated vulnerabilities may be identified as described herein.

It is understood that the above illustration is only one illustrative example of the operation of token comparator, and that token comparator 314 may identify a matching code stored in code repository 114 in other ways. For instance, token comparator 314 may be configured to identify a matching code based on matching all of the tokens of the neutralized code, a minimum (e.g., threshold) number or percentage of matching tokens, or in any other manner as will be appreciated by those skilled in the relevant arts. Further, token comparator 314 need not identify a single matching code stored in code repository 114, but rather may identify a plurality of possible matching codes (e.g., the top 3 most similar matching codes).

In some implementations, a score may be generated for a set of code stored in code repository 114 identified as potentially matching the neutralized code. For example, FIG. 6 shows a flowchart of a method for generating a confidence score that an identification is accurate, in accordance with an example embodiment. In an implementation, the method of flowchart 600 may be implemented by score generator 316. FIG. 6 is described with continued reference to FIG. 3. Other structural and operational implementations will be apparent to persons skilled in the relevant art(s) based on the following discussion regarding flowchart 600 and system 300 of FIG. 3.

Flowchart 600 begins with step 602. In step 602, a confidence score is generated that comprises a measure of confidence that an identification of an origin of the firmware code is accurate. For instance, with reference to FIG. 3, score generator 316 may generate a confidence score that firmware identifier 312 accurately identified an origin of firmware code 118. In examples, score generator 316 generates such a confidence score based at least on the comparison the first neutralized code (or a portion, e.g., a token, thereof) to codes (or tokens) stored in code repository 114. The confidence score may comprise a value, grading, percentage, or any other rating resembling the confidence (e.g., likelihood) that the identified origin of firmware code 118 is accurate and/or a confidence that two codes (the neutralized code and the matching code from the repository) are similar or identical. In examples, the confidence score may be a percentage or ratio of the number of matching tokens between the neutralized code generated by code compiler 310 and a matching code identified from code repository 114. As an illustration, if the neutralized code comprised a total of 20 tokens and a set of code in code repository contained 19 of those same tokens, score generator 316 may generate a confidence score indicating that there is a 95% chance that origin of firmware code 118 is accurately identified. It is noted that this example is illustratively only, and other techniques for generating a confidence score may also be implemented.

In implementations, code analyzer UI 106 may receive the confidence score for presentation alongside or currently with an identification of the origin of firmware code 118. For instance, code analyzer UI 106 may indicate, via one or more user interface elements, a 95% confidence that firmware code 118 utilizes a particular open-source library and/or version thereof. Code analyzer UI 106 may also indicate any other information relating to the comparison described herein, such as an identification of which portions or tokens of the code matched or did not match, an identification of other code libraries that comprised a lesser confidence score (e.g., a next closest match located in code repository 114), or any other information that may indicate a measure of similarity between a neutralized code generated from firmware code 118 and/or one or more codes stored in code repository 114.

As described above, code repository 114 may comprise a database of known firmware codes. Code repository may be generated or populated in various ways. For example, FIG. 7 shows a flowchart of a method for learning a firmware code, in accordance with an example embodiment. In an implementation, the method of flowchart 700 may be implemented by code learner 302. FIG. 7 is described with continued reference to FIG. 3. Other structural and operational implementations will be apparent to persons skilled in the relevant art(s) based on the following discussion regarding flowchart 700 and system 300 of FIG. 3.

Flowchart 700 begins with step 702. In step 702, a known firmware code and an origin thereof is received. For instance, with reference to FIG. 3, code learner 302 may receive 322 a known firmware code and an origin thereof. Code learner 302 may receive such information in various ways, such as via code analyzer UI 106. As an example, a user of code analyzer UI 106 may upload, via one or more interactive interface elements, a known firmware code (e.g., as a firmware image, a file, etc.), along with an indication of the origin of the firmware code (e.g., an indication of the developer, vendor, etc.) and/or a version of the firmware code. The indication of the origin of the firmware code and/or the version of the firmware code (e.g., OpenSSL, version 1.0.1) may be inputted via one or more text fields of code analyzer UI 106, or via any other input methods.

In a further implementation, code analyzer UI 106 may receive, via one or more interactive interface elements, other information associated with the provided firmware code, such as the computing architecture for which the known firmware was designed, information associated with a compiler configuration used to generate the known firmware code, an indication of whether any known vulnerabilities exist for the known firmware code, an indication of any software updates for the known firmware code, an identification of the model, type, or category of devices (e.g., cameras, routers, etc.) for which the known firmware code is to be installed, a vendor name associated with the known firmware code, or any other descriptive information associated with the known firmware code that may be stored in code repository 114.

In step 704, a second neutralized code generated from the known firmware code, along with an indication of the origin of the known firmware code, is stored in the code repository. For instance, with reference to FIG. 3, code learner 302 may be configured to cause a neutralized code to be generated and store the neutralized code, along with an indication of the origin of the known firmware code, in code repository 114. In examples, code learner 302 may cause the neutralized code for the known firmware code to be generated in accordance with techniques described herein. For example, the known firmware code may be provided 326 to firmware disassembler 304, and firmware disassembler may disassemble the known firmware code to generate assembly code therefrom. Decompiler 306 may decompile the assembly code to generate source code for the known firmware code. Code neutralizer 308 may generate a neutralized code from the source code and provide 342 the neutralized code (e.g., SFC) to code learner 302 for storing 344 in code repository 114 along with an indication of the origin of the known firmware code.

This process of learning known firmware codes may be repeated in a similar fashion for each code or code library. In this manner, code repository 114 may be comprised of a database of neutralized codes (e.g., signatures) for known firmware codes (e.g., code libraries), along with their associated versions. When an unknown firmware code (e.g., firmware code 118) is provided to code similarity engine 112 to identify an origin thereof, a neutralized code generated from firmware code 118 (or tokens thereof) may be compared against one or more codes (or tokens thereof) in code repository 114 as described herein to find a matching code and identify the origin of the unknown firmware code.

Thus, in accordance with techniques described above, code repository 114 may be automatically generated and/or populated in a relatively fast manner while also reducing the amount of human intervention needed (e.g., by eliminating the need for a human to manually analyze a code or create a signature). Further, techniques described above may enable new libraries or library version to be added to code repository 114 in a simple manner (e.g., by providing the library to code learner 302 and an identification of its origin). Further, by neutralizing information contained in the source code to generate neutralized code, code differences that may be the result of different computing architectures and/or compiler configurations can be reduced or even eliminated, thereby enabling code similarity engine 112 to identify an origin of an unknown code even if code repository 114 is populated with one or more codes or libraries associated with a different computing architecture or compiler configuration. In other words, even if unknown firmware code 118 is associated with a first computing architecture (e.g., X86), firmware identifier 312 may still identify the origin of the firmware code by locating an appropriate matching code that was associated with a different computing architecture due to the neutralization of the computing architecture elements present in decompiled source code.

A non-limiting illustration of the above techniques will now be described. For instance, FIGS. 8A and 8B show illustrative examples of decompiled source code, in accordance with an example embodiment. In particular, FIG. 8A illustrates a first decompiled source code 800 generated by decompiler 306, and FIG. 8B illustrates a second decompiled source code 810 also generated by decompiler 306. In this illustrative example, first decompiled source code 800 may be generated from an unknown firmware code (e.g., firmware code 118 whose origin is not known). Second decompiled source code 810 may comprise the decompiled source code of a known code library, of which the neutralized code (described later) is stored in code repository 114.

In this example, first decompiled source code 800 and second decompiled source code 810 may comprise the same open source library that is implemented on different computing architectures. For instance, first decompiled source code 800 may be associated an open source library implemented on a first computing architecture (e.g., PowerPC), while second decompiled source code 810 may be associated with the same open source library implemented on a second computing architecture (e.g., X64). As illustrated in FIGS. 8A and 8B, certain differences 802, 812 may be present in the two different versions of the decompiled source code. Such differences, outlined in FIGS. 8A and 8B, may be the result of the different implementations (e.g., computing architectures) for the same open source library.

Figure 9A:
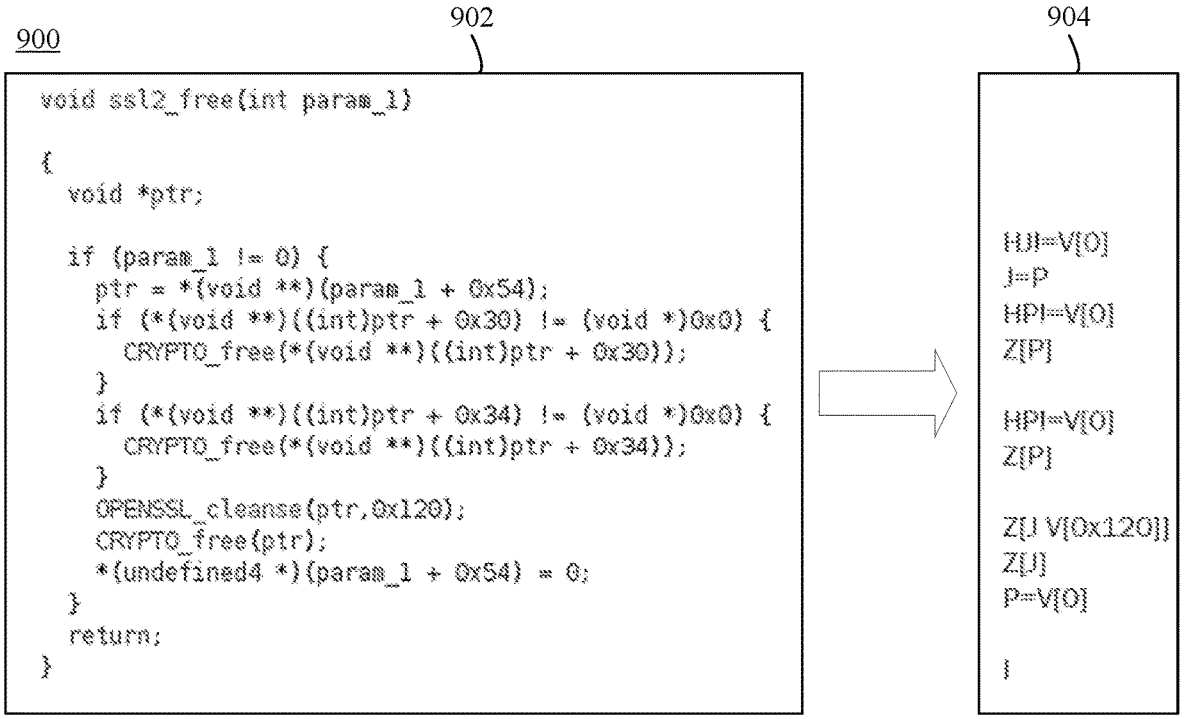
FIGS. 9A and 9B show illustrative examples of generating neutralized code from source code, in accordance with an example embodiment.
Figure 9B:
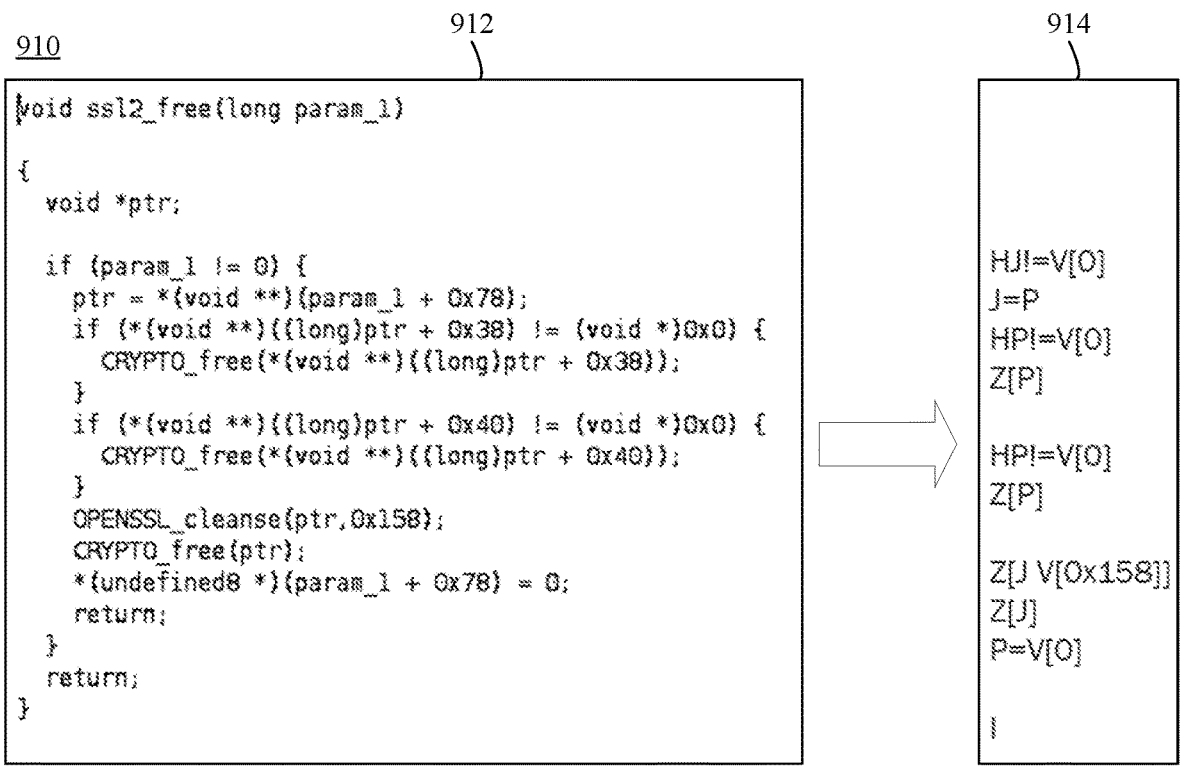

FIGS. 9A and 9B show illustrative examples of generating neutralized code from source code, in accordance with an example embodiment. For instance, FIG. 9A illustrates a first transformation 900 of a first decompiled source code 902 to a first neutralized code 904, and FIG. 9B illustrates a second transformation 910 of a second decompiled source code 912 to a second neutralized code 914. In this example, first decompiled source code 902 of FIG. 9A corresponds to first decompiled source code shown in FIG. 8A (e.g., code based on an unknown code library), and second decompiled source code 912 corresponds to second decompiled source code 810 shown in FIG. 8B (e.g., code based on a known firmware library, a neutralized version of which is stored in code repository 114).

First transformation 900 of first decompiled source code 902 to first neutralized code 904, and second transformation 910 of second decompiled source code 912 to second neutralized code 914 may be carried out by compiler 310 described herein. For instance, as shown in FIG. 9A, symbols of first decompiled source code 902 may be mapped to symbols of first neutralized code 904 as described above, such as by mapping each function in the source code (e.g., CRYPTO_free, OPENSSL_cleanse) to a single letter ("Z") symbol of first neutralized code 904. Such mapping may be repeated for each symbol of first decompiled source code 902 to generate first neutralized code 904.

Second transformation 910 may be carried out in a similar manner as described above with respect to first transformation 900. second neutralized code 914 may be stored in code repository 114 as a known code (e.g., a known code library), along with an indication of its origin, version, and/or any other information described herein.

Figure 10:
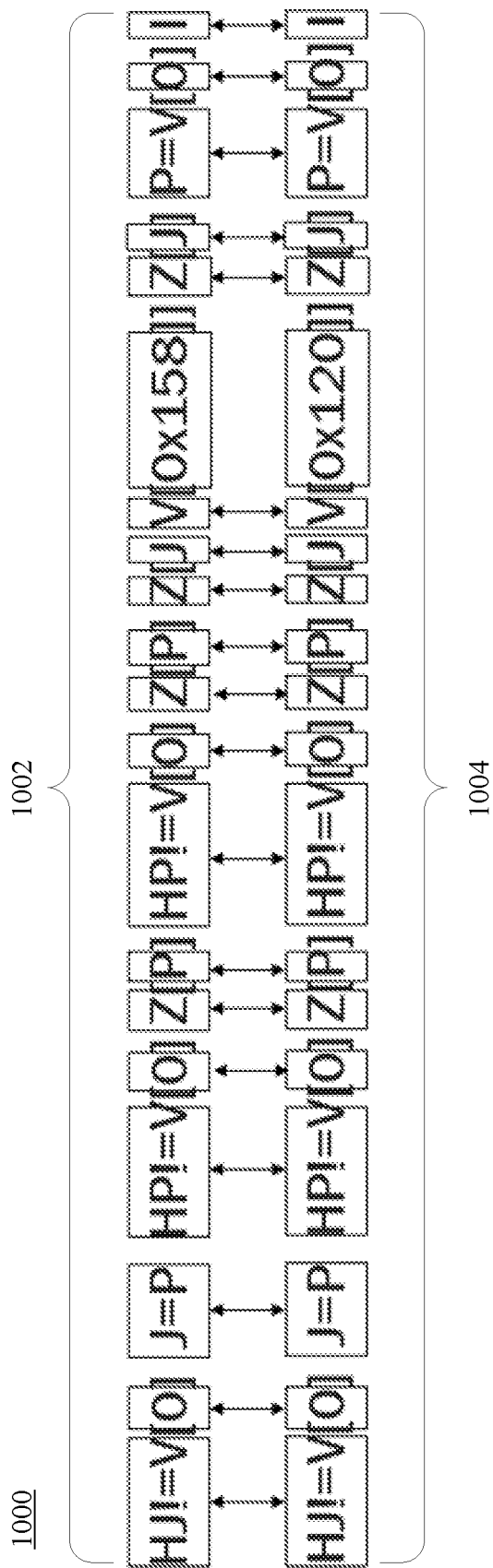
FIG. 10 shows an illustrative example comparison of tokens of neutralized code, in accordance with an example embodiment.

FIG. 10 shows an illustrative example comparison 1000 of tokens of neutralized code, in accordance with an example embodiment. In implementations, comparison 1000 illustrated in FIG. 10 may be carried out by token comparator 314 as described herein. As shown in FIG. 10, comparison 1000 comprises a comparison between a first set of tokens 1002 and a second set of tokens 1004. First set of tokens 1002 may correspond to first neutralized code 904 of FIG. 9A, and second set of tokens 1004 may correspond to second neutralized code 914 of FIG. 9B. Thus, in this example, first set of tokens 1002 may be associated with a code or library whose origin is unknown, while second set of tokens 1004 may comprise a set of tokens associated with a code or library stored in code repository 114 whose origin is known.

As shown in FIG. 10, the comparison of tokens between first set of tokens 1002 and second set of tokens 1004 may be performed by token comparator 314 on a token-by-token basis. For instance, the first illustrated token of first set of tokens 1002 may be identified as matching (e.g., identical) the first illustrated token of second set of tokens 1004. Such a comparison may be performed for each of the tokens in first set of tokens 1002 and second set of tokens 1004 to identify each of the matching tokens. Based on the matched tokens, token comparator 314 may determine that first set of tokens 1002 (corresponding to an unknown code library) is similar or identical to second set of tokens 1004, and therefore identify the origin of the first set of tokens 1002 as comprising the stored origin (e.g., stored in the repository) of second set of tokens 1004. In this manner, token comparator 314 may determine an origin of an unknown code, even where the unknown code or library is associated with a different computing architecture than the code or library stored in the repository.

While it has been described in some implementations that a single open-source library and an associated version thereof may be identified in accordance with techniques described herein, it is contemplated that a plurality of libraries may be identified. For instance, in some examples, a plurality of firmware files may be uploaded (e.g., as a batch) via code analyzer UI 106 for analysis by code similarity engine 112. In other examples, firmware code 118 may comprise a firmware image (e.g., a compressed file) that comprises a plurality of different files (e.g., executable portions) contained therein, where the files (or even an individual file) use several different open-source libraries. In such an example, code similarity engine 112 may be configured to decompress the firmware image to extract each file, and each file may be analyzed to identify an origin of any open-source libraries used therein in accordance with techniques disclosed herein. Thus, code similarity engine 112 may be configured to identify the origin of components contained within firmware files that comprise a plurality of statically compiled libraries.

Upon analyzing each of the files contained in the firmware image, code similarity engine 112 may provide the results of the analysis (including but not limited to the origin of any libraries identified in files contained in the firmware image as well as any associated versions of those libraries) for presentation on code analyzer UI 106. In some implementations, code analyzer UI 106 may also display additional information or metadata relating to the code analysis, including but not limited to, an identification of each file that contains a library for which an origin is identified, a confidence score associated with each identified origin, a processing time, a start or end time of the analysis, a number of files identified in the firmware image, a number of libraries found in the firmware image, an identification and/or number of security vulnerabilities, a categorization of each of the vulnerabilities based on a risk level, and/or any other information related to the analysis. Based on the information provided to code analyzer UI 106, the devices (e.g., portable device 102) coupled to an enterprise network that contain vulnerabilities can be readily identified, and the risk those devices pose to the network can be identified, enabling those vulnerabilities to be addressed and/or resolved in a timely manner.

It is also noted and understood that while example embodiments have been described for detecting an origin of a firmware code, code similarity engine may be implemented in a similar manner to detect other types of software as well, such as applications or other executable programs. In other words, techniques described herein may be applicable to software generally, and is not limited to identifying an origin of firmware code.

III. Example Computer System Implementation

Portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, flowchart 200, flowchart 400, flowchart 500, flowchart 600, and/or flowchart 700 may be implemented in hardware, or hardware combined with one or both of software and/or firmware. For example, portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, flowchart 200, flowchart 400, flowchart 500, flowchart 600, and/or flowchart 700 may be implemented as computer program code/instructions configured to be executed in one or more processors and stored in a computer readable storage medium.

Alternatively, portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, flowchart 200, flowchart 400, flowchart 500, flowchart 600, and/or flowchart 700 may be implemented as hardware logic/electrical circuitry.

For instance, in an embodiment, one or more, in any combination, of portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, flowchart 200, flowchart 400, flowchart 500, flowchart 600, and/or flowchart 700 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 11:
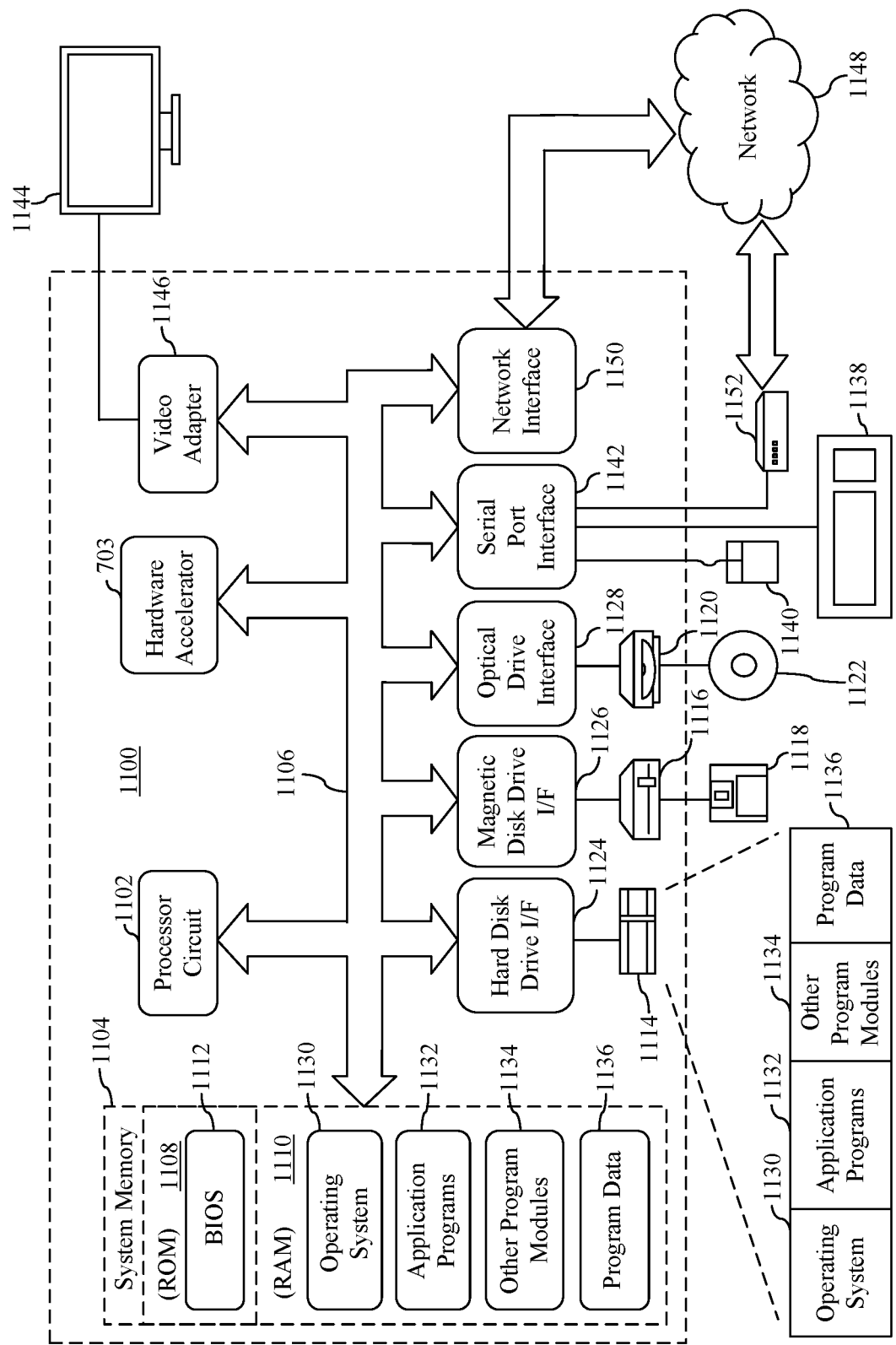
FIG. 11 is a block diagram of an example processor-based computer system that may be used to implement various embodiments.

FIG. 11 depicts an exemplary implementation of a computing device 1100 in which embodiments may be implemented. For example, portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, flowchart 200, flowchart 400, flowchart 500, flowchart 600, and/or flowchart 700 (and/or any of the steps of flowcharts 200, 400, 500, 600, and 700 described therein) may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a hardware accelerator 1103, a system memory 1104, and a bus 1106 that couples various system components including system memory 1104 to processor circuit 1102 and hardware accelerator 1103. Processor circuit 1102 and/or hardware accelerator 1103 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing any of the features of portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, flowchart 200, flowchart 400, flowchart 500, flowchart 600, and/or flowchart 700 and/or further embodiments described herein.

A user may enter commands and information into computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Mobile Device Implementation

Figure 12:
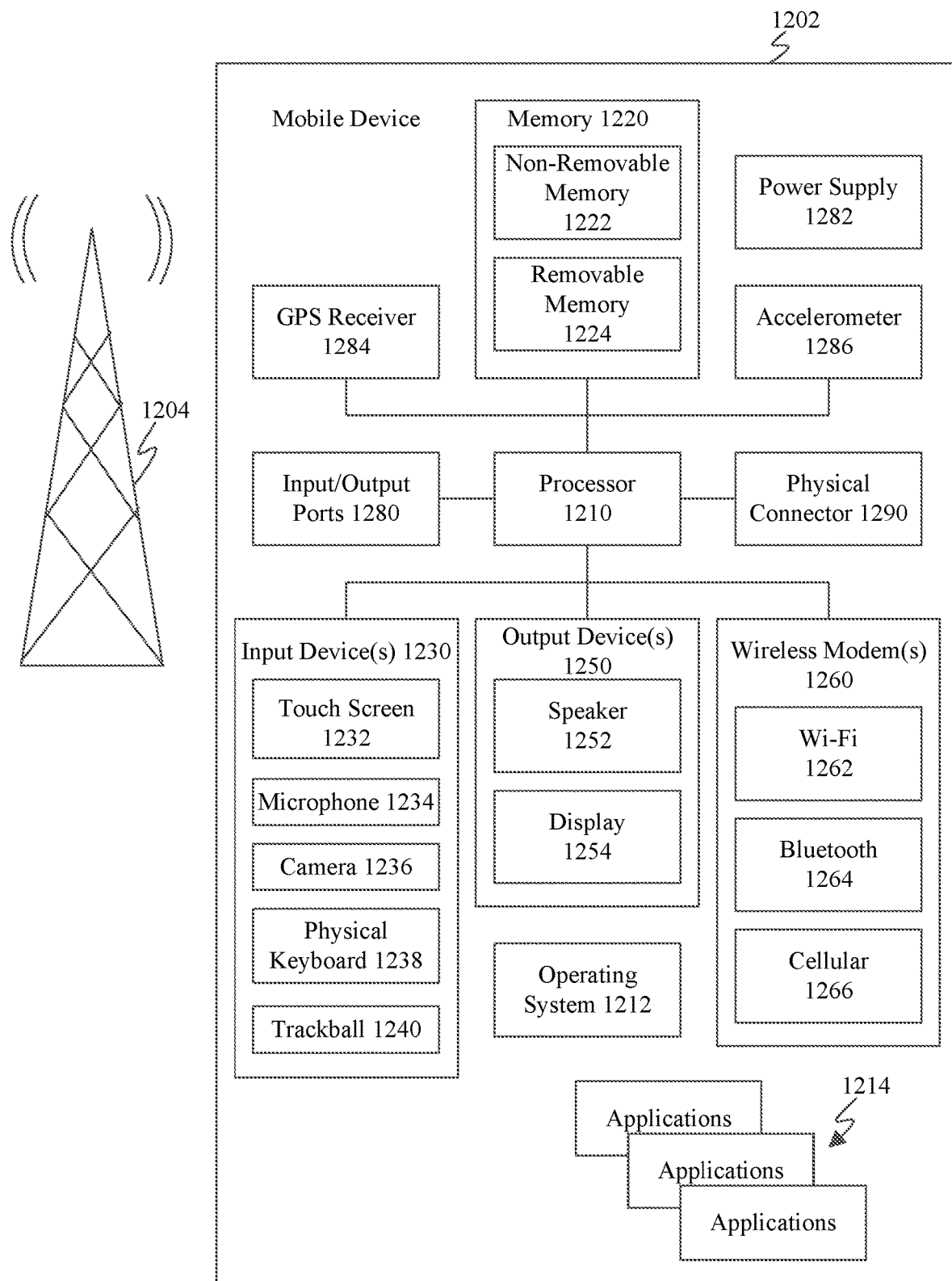
FIG. 12 is a block diagram of an example mobile device that may be used to implement various embodiments.

FIG. 12 is a block diagram of an exemplary mobile device 1202 that may implement embodiments described herein. For example, mobile device 1202 may be used to implement any of portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, or steps of flowchart 200, flowchart 400, flowchart 500, flowchart 600, and/or flowchart 700. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smartphone, handheld computer, Personal Digital Assistant (PDA), etc.) and can allow wireless two-way communications with one or more mobile communications networks 1204, such as a cellular or satellite network, or with a local area or wide area network.

The illustrated mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., digital personal assistants, e-mail applications, calendars, contact managers, web browsers, messaging applications) and any other computing applications (e.g., word processing applications, mapping applications, media player applications).

The illustrated mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and applications 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. The input devices 1230 can include a Natural User Interface (NUI).

Wireless modem(s) 1260 can be coupled to antenna(s) (not shown) and can support two-way communications between the processor 1210 and external devices, as is well understood in the art. The modem(s) 1260 are shown generically and can include a cellular modem 1266 for communicating with the mobile communication network 1204 and/or other radio-based modems (e.g., Bluetooth 1264 and/or Wi-Fi 1262). At least one of the wireless modem(s) 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted, and other components can be added as would be recognized by one skilled in the art.

In an embodiment, mobile device 1202 is configured to perform any of the functions of any of portable device 102, computing device 104, code analyzer UI 106, server 110, code similarity engine 112, code repository 114, vulnerability database 116, firmware code 118, code learner 302, firmware disassembler 304, decompiler 306, code neutralizer 308, compiler 310, firmware identifier 312, token comparator 314, score generator 316, vulnerability determiner 318, or steps of flowchart 200, flowchart 400, flowchart 500, flowchart 600, and/or flowchart 700. Computer program logic for performing the functions of these devices may be stored in memory 1220 and executed by processor 1210. By executing such computer program logic, processor 1210 may be caused to implement any of the features of any of these devices. Also, by executing such computer program logic, processor 1210 may be caused to perform any or all of the steps of flowchart 200, flowchart 400, flowchart 500, flowchart 600, and/or flowchart 700.

V. Further Example Embodiments

A system for identifying an origin of a device firmware component is disclosed herein. The system includes: at least one processor circuit; and at least one memory that stores program code configured to be executed by the at least one processor circuit, the program code comprising: a firmware disassembler configured to disassemble firmware code to generate assembly code; a decompiler configured to decompile the assembly code to generate source code; a code neutralizer configured to generate a first neutralized code from the source code; a firmware identifier configured to compare at least a portion of the neutralized code to a code repository to identify an origin of the firmware code; and a vulnerability determiner configured to determine whether the firmware code contains a vulnerability based at least on the identified origin.

In one implementation of the foregoing system, the firmware identifier is further configured to identify a version of the firmware code based at least on the comparison of at least the portion of the neutralized code to the code repository.

In another implementation of the foregoing system, the origin of the firmware code is an open-source library, and the version of the firmware code is a version of the open-source library.

In another implementation of the foregoing system, the code neutralizer comprises a compiler configured to map each of a plurality of symbols in the source code to a plurality of neutralized symbols.

In another implementation of the foregoing system, the portion of the first neutralized code comprises a token of the first neutralized code and the firmware identifier is configured to compare the token of the first neutralized code to a plurality of tokens in the code repository to identify the origin of the firmware code using a text similarity search.

In another implementation of the foregoing system, the firmware identifier is configured to generate a confidence score that comprises a measure of confidence that the identification of the origin of the firmware code is accurate, the confidence score generated based at least on the comparison of at least the portion of the first neutralized code to the code repository.

In another implementation of the foregoing system, the firmware identifier is configured to identify the origin of the firmware code by identifying a matching code in the code repository and a computing architecture associated with the firmware code is different than a computing architecture associated with the matching code in the code repository.

In another implementation of the foregoing system, the system includes a code learner configured to receive a known firmware code and an origin thereof, and store, in the code repository, a second neutralized code generated from the known firmware code along with an indication of the origin of the known firmware code.

A method for identifying an origin of a device firmware component is disclosed herein. The method includes disassembling firmware code to generate assembly code; decompiling the assembly code to generate source code; generating a first neutralized code from the source code; comparing at least a portion of the neutralized code to a code repository to identify an origin of the firmware code; and determining whether the firmware code contains a vulnerability based at least on the identified origin.

In one implementation of the foregoing method, the method further includes identifying a version of the firmware code based at least on the comparison of at least the portion of the neutralized code to the code repository.

In another implementation of the foregoing method, the origin of the firmware code is an open-source library, and the version of the firmware code is a version of the open-source library.

In another implementation of the foregoing method, the generating a first neutralized code comprises: mapping each of a plurality of symbols in the source code to a plurality of neutralized symbols.

In another implementation of the foregoing method, the portion of the first neutralized code comprises a token of the first neutralized code and the comparing at least the portion of the neutralized code to the code repository comprising comparing the token of the first neutralized code to a plurality of tokens in the code repository to identify the origin of the firmware code using a text similarity search.

In another implementation of the foregoing method, the method further includes generating a confidence score that comprises a measure of confidence that the identification of the origin of the firmware code is accurate, the confidence score generated based at least on the comparison of at least the portion of the first neutralized code to the code repository.

In another implementation of the foregoing method, the comparing at least the portion of the neutralized code to the code repository comprises identifying the origin of the firmware code by identifying a matching code in the code repository; and a computing architecture associated with the firmware code is different than a computing architecture associated with the matching code in the code repository.

In another implementation of the foregoing method, the method further includes receiving a known firmware code and an origin thereof, and storing, in the code repository, a second neutralized code generated from the known firmware code along with an indication of the origin of the known firmware code.

A computer-readable storage medium is disclosed herein. The computer-readable storage medium has program instructions recorded thereon that, when executed by at least one processor of a computing device, perform a method, the method comprising: disassembling firmware code to generate assembly code; decompiling the assembly code to generate source code; generating a first neutralized code from the source code; comparing at least a portion of the neutralized code to a code repository to identify an origin of the firmware code; and determining whether the firmware code contains a vulnerability based at least on the identified origin.

In one implementation of the foregoing computer-readable storage medium, the generating a first neutralized code comprises mapping each of a plurality of symbols in the source code to a plurality of neutralized symbols.

In another implementation of the foregoing computer-readable storage medium, the portion of the first neutralized code comprises a token of the first neutralized code; and the comparing at least the portion of the neutralized code to the code repository comprising comparing the token of the first neutralized code to a plurality of tokens in the code repository to identify the origin of the firmware code using a text similarity search.

In one implementation of the foregoing computer-readable storage medium, the method further includes receiving a known firmware code and an origin thereof; and storing, in the code repository, a second neutralized code generated from the known firmware code along with an indication of the origin of the known firmware code.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for identifying an origin of a device firmware component, the system comprising:
   at least one processor circuit; and
   at least one memory that stores program code configured to be executed by the at least one processor circuit, the program code comprising:
   a firmware disassembler configured to disassemble firmware code to generate assembly code, wherein the firmware code is obtained from a portable device and an origin of the firmware code is unknown;
   a decompiler configured to decompile the assembly code to generate first source code comprising a programming language;
   a code neutralizer configured to generate a first neutralized code from the first source code, the first neutralized code comprising a plurality of symbols that describes logic of different portions of the first source code;
   a firmware identifier configured to:
   separate the first neutralized code into a first set of tokens;
   compare the first set of tokens of the first neutralized code to a second set of tokens in a code repository using a text similarity;
   generate a confidence score based at least on a number of matching tokens between the first set of tokens to the second set of tokens in the code repository, wherein the second set of tokens is associated with second source code that is different than the first source code, and wherein the first set of tokens and the second set of tokens are associated with a same library; and
   identify the origin of the firmware code based on the confidence score, wherein the code repository is populated with one or more codes associated with a different computing architecture or compiler configuration than the firmware code; and
   a vulnerability determiner configured to determine whether the firmware code contains a vulnerability based at least on the identified origin.

2. The system of claim 1, wherein the firmware identifier is further configured to identify a version of the firmware code based at least on the comparison of the first set of tokens of the first neutralized code to the second set of tokens in the code repository.

3. The system of claim 2, wherein the origin of the firmware code is an open-source library, and the version of the firmware code is a version of the open-source library.

4. The system of claim 1, wherein the code neutralizer comprises a compiler configured to map each of a plurality of symbols in the first source code to a plurality of neutralized symbols.

5. The system of claim 1, wherein the confidence score comprises a measure of confidence that the identification of the origin of the firmware code is accurate.

6. The system of claim 1, wherein the firmware identifier is configured to identify the origin of the firmware code by identifying a matching code in the code repository, and
   wherein a computing architecture associated with the firmware code is different than a computing architecture associated with the matching code in the code repository.

7. The system of claim 1, further comprising a code learner configured to:
   receive a known firmware code and an origin thereof, and
   store, in the code repository, a second neutralized code generated from the known firmware code along with an indication of the origin of the known firmware code.

8. The system of claim 1, wherein the firmware identifier is configured to compare the first set of tokens of the first neutralized code to the second set of tokens in the code repository by:
   determining if one or more of the second set of tokens in the code repository is at least a partial match to a token of the first set of tokens of the first neutralized code.

9. A method for identifying an origin of a device firmware component, the method comprising:
   disassembling firmware code to generate assembly code, wherein the firmware code is obtained from a portable device and an origin of the firmware code is unknown;
   decompiling the assembly code to generate first source code comprising a programming language;
   generating a first neutralized code from the first source code, the first neutralized code comprising a plurality of symbols that describes logic of different portions of the first source code;
   separating the first neutralized code into a first set of tokens;
   comparing the first set of tokens of the first neutralized code to a second set of tokens in a code repository using a text similarity;

generating a confidence score based at least on a number of matching tokens between the first set of tokens to the second set of tokens in the code repository, wherein the second set of tokens is associated with second source code that is different than the first source code, and wherein the first set of tokens and the second set of tokens are associated with a same library;

identifying the origin of the firmware code based on the confidence score, wherein the code repository is populated with one or more codes associated with a different computing architecture or compiler configuration than the firmware code; and determining whether the firmware code contains a vulnerability based at least on the identified origin.

10. The method of claim 9, further comprising:

identifying a version of the firmware code based at least on the comparison of the first set of tokens of the first neutralized code to the second set of tokens in the code repository.

11. The method of claim 10, wherein the origin of the firmware code is an open-source library, and the version of the firmware code is a version of the open-source library.

12. The method of claim 9, wherein the generating a first neutralized code comprises:

mapping each of a plurality of symbols in the first source code to a plurality of neutralized symbols.

13. The method of claim 9, wherein the confidence score comprises a measure of confidence that the identification of the origin of the firmware code is accurate.

14. The method of claim 9, wherein the identifying the origin of the firmware code comprises identifying a matching code in the code repository; and wherein a computing architecture associated with the firmware code is different than a computing architecture associated with the matching code in the code repository.

15. The method of claim 9, further comprising:

receiving a known firmware code and an origin thereof; and storing, in the code repository, a second neutralized code generated from the known firmware code along with an indication of the origin of the known firmware code.

16. The method of claim 9, wherein the comparing the first set of tokens of the first neutralized code to the second set of tokens in the code repository comprises:

determining if one or more of the second set of tokens in the code repository is at least a partial match to a token of the first set of tokens of the first neutralized code.

17. A computer-readable storage medium having program instructions recorded thereon that, when executed by at least one processor of a computing device, perform a method, the method comprising:

disassembling firmware code to generate assembly code, wherein the firmware code is obtained from a portable device and an origin of the firmware code is unknown;

decompiling the assembly code to generate first source code comprising a programming language;

generating a first neutralized code from the first source code, the first neutralized code comprising a plurality of symbols that describes logic of different portions of the first source code;

separating the first neutralized code into a first set of tokens;

comparing the first set of tokens of the first neutralized code to a second set of tokens in a code repository using a text similarity;

generating a confidence score based at least on a number of matching tokens between the first set of tokens to the second set of tokens in the code repository, wherein the second set of tokens is associated with second source code that is different than the first source code, and wherein the first set of tokens and the second set of tokens are associated with a same library; and identifying the origin of the firmware code based on the confidence score, wherein the code repository is populated with one or more codes associated with a different computing architecture or compiler configuration than the firmware code; and determining whether the firmware code contains a vulnerability based at least on the identified origin.

18. The computer-readable storage medium of claim 17, wherein the generating a first neutralized code comprises:

mapping each of a plurality of symbols in the first source code to a plurality of neutralized symbols.

19. The computer-readable storage medium of claim 17, further comprising:

receiving a known firmware code and an origin thereof; and storing, in the code repository, a second neutralized code generated from the known firmware code along with an indication of the origin of the known firmware code.

20. The computer-readable storage medium of claim 17, wherein the comparing the first set of tokens of the first neutralized code to the second set of tokens in the code repository comprises:

determining if one or more of the second set of tokens in the code repository is at least a partial match to a token of the first set of tokens of the first neutralized code.

* * * * *